July 19, 1932.  A. O. ABBOTT, JR  1,867,557
TIRE SHAPING MACHINE
Filed June 22, 1928
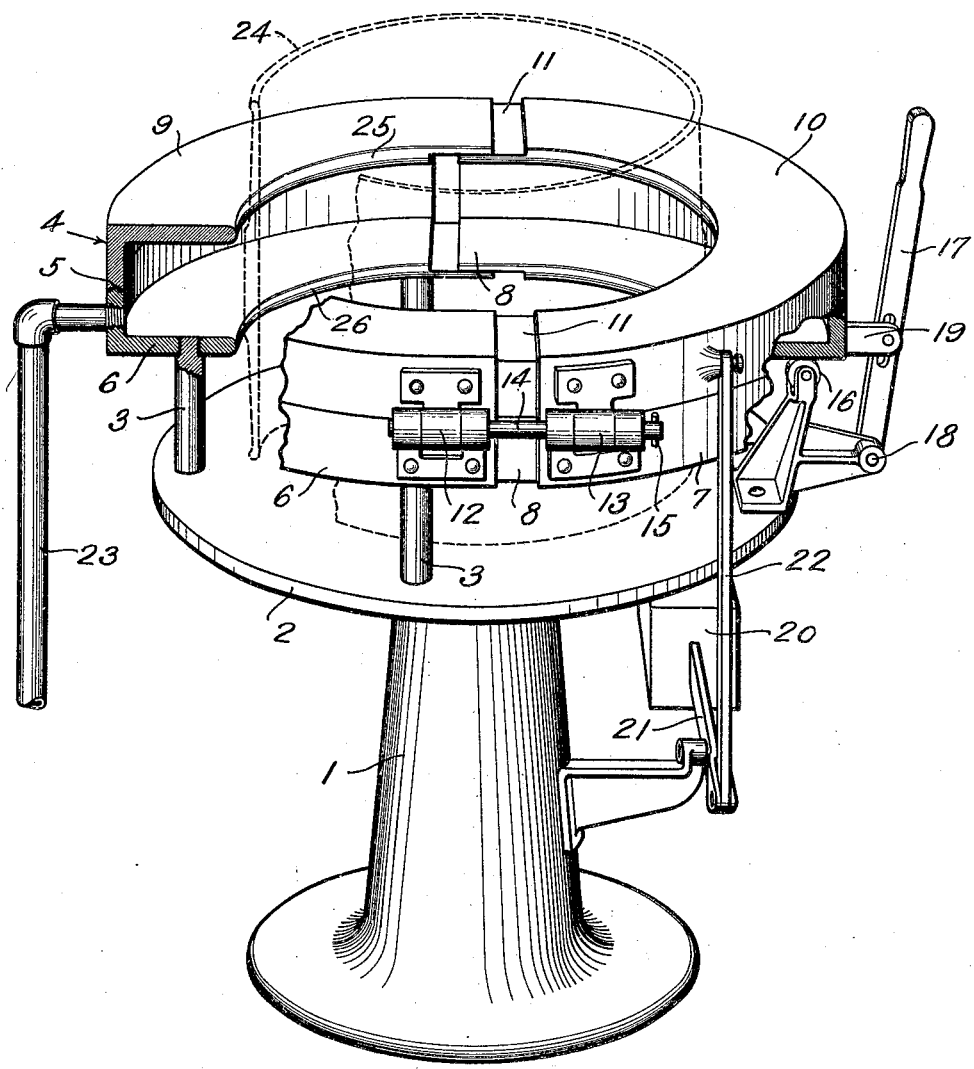
INVENTOR.
Adrian O. Abbott, Jr.
BY
ATTORNEY

Patented July 19, 1932

1,867,557

UNITED STATES PATENT OFFICE

ADRIAN O. ABBOTT, JR., OF DETROIT, MICHIGAN, ASSIGNOR TO MORGAN AND WRIGHT, OF DETROIT, MICHIGAN, A CORPORATION OF MICHIGAN

TIRE SHAPING MACHINE

Application filed June 22, 1928. Serial No. 287,619.

This invention relates to a tire shaping machine, more particularly to a machine of the vacuum type.

Instead of the old method of building up a pneumatic tire directly in tire shape, tires are at present largely manufactured by building up a tire carcass in the form of an endless flat or crowned pulley band, after which the pulley band is expanded along its medial line while bringing its bead portions toward each other and thereby forming it into approximately tire shape. To accomplish this shaping of the pulley band, machines of what are known as the "vacuum" type are largely used. These machines generally comprise a substantially annular box which is of general U-shape in transverse section and open on its inner perimeter, means being provided for exhausting the air from the box. In bringing a pulley band to tire shape, it is inserted within the annulus of the shaping machine with its outer wall bearing against the opening in the vacuum box, and upon the application of a vacuum to the box, the medial portion of the pulley band is drawn into the box and the bead portions of the band are caused to approach each other. The present invention relates to an improved shaping machine of the vacuum type.

An object of the invention is to provide a simple, cheap, durable and easily operated tire shaping machine of the vacuum type.

Another object is to provide a vacuum tire shaping machine which will permit of the easy introduction of the flat pulley band into the shaping machine and also of a quick and easy removal of the shaped carcass from the machine.

A further object is to provide a vacuum shaping machine capable of use with more than one diameter of pulley band.

The invention broadly consists of a vacuum shaping box of endless form and approximately U-shaped in transverse section, with the open side of the box on the inner perimeter thereof, the box being formed of sections which are relatively adjustable to increase or decrease the inner perimeter while maintaining its continuity. The invention further consists in making the box in sections separable along a plane transverse to its axis, while at the same time permitting the aforesaid enlargement or reduction of the inner perimeter of the box.

For a detailed disclosure of the nature and objects of the invention, reference is had to the accompanying specification and drawing, in which latter:

The figure represents a perspective of the apparatus with parts broken away.

Referring to the drawing, the numeral 1 designates the base of the machine, upon which is disposed a table 2 which provides a support for the unshaped pulley band. Extending upwardly from the table are posts 3 supporting in part a vacuum shaping box designated generally by the numeral 4. This box is horizontally divided, or in a plane transverse to its axis, to form upper and lower separable sections having a closely interfitting connection at 5. While in the present instance the connection 5 is shown as substantially midway between the top and bottom of the box, it will be obvious from the later description that this connection may be disposed at other points in the box as long as it permits of easy removal of a shaped tire casing, which is the purpose of the connection 5, as will be later set forth.

The lower section of the shaping box is divided into adjustably connected sections or portions which in the present instance are shown as two in number and designated by the numerals 6 and 7. While any suitable connection may be used, the parts 6 and 7 in the present instance are shown as connected by a telescopic joint 8. In a similar manner, the upper section of the shaping box is shown as divided into adjustably connected sections 9 and 10, connected by a telescopic joint 11. In order to permit easy separation of the upper and lower sections, they are shown as connected by the hinges 12 and 13, and in order that the respective parts 7 and 10 may move relatively to the parts 6 and 9, hinge 13 is slidably mounted upon the hinge pin 14, while a stop pin 15 on the hinge pin limits outward movement of the hinge 13 and parts connected thereto. Those portions 7 and 10 of the vacuum box which are movable relatively to the remainder of the box are supported by a roller 16 bearing against the lower part 7. Movement of the parts 7 and 10 toward and from the balance of the box is accomplished in the present instance by means of a hand lever 17 pivotally mounted at 18 and connected to the part 7 by a link 19. It is obvious, however, that any other suitable method of actuating the movable portion of the vacuum box may be used. In order to provide for easy movement of the upper section of the vacuum box on its hinges, a counterweight 20 is provided which is carried by the pivotally mounted lever 21 connected by a link 22 to the part 10. The link 22 is loosely connected at its ends in order to prevent binding during the movement of the parts 7 and 10. A pipe 23 leads into the vacuum box 4 and is connected at its other end with any suitable form of exhausting apparatus.

In operation the lever 17 is actuated to move outwardly the parts 7 and 10 and thus enlarge the space within the circumscribing vacuum box 4. This enlargement permits the easy insertion of a pulley band 24 which is to be brought to tire shape, the lower edge of the unshaped pulley band resting upon the table 2. The lever 17 is then moved in the opposite direction to cause the parts 7 and 10 of the vacuum box to approach the parts 6 and 9, and in this operation the upper and lower free edges 25 and 26 of the vacuum box engaged the unshaped pulley band, after which the vacuum is applied. It is unnecessary to exert any great pressure on the lever 17, for the reason that as soon as the vacuum is applied, it tends to pull in the parts 7 and 10 toward the parts 6 and 9, and thereby maintains the free edges 25 and 26 tightly against the pulley band while the latter is being expanded and drawn into the vacuum box. Thus there is obtained a desirable self-sealing action of the edges of the movable portions of the vacuum box on the outer surface of the pulley band. When the pulley band has been drawn into the vacuum box and its bead portions brought toward each other, the vacuum is released and the top section of the vacuum box is opened on the hinges 12 and 13 thereby permitting easy removal of the shaped tire carcass. The top section is then swung back into place on the lower section, the lever 17 operated to move outwardly the parts 7 and 10, another unshaped pulley band inserted, and the operations repeated as before. It will be seen that by reason of the telescopic connections 11 and 8, the continuity of the inner perimeter of the box at both the upper and lower edges 25 and 26 is maintained during all adjustment of the parts 7 and 10 with respect to the parts 6 and 9. By reason of this construction, the inner perimeter of the vacuum box may be enlarged not only to permit easy introduction of an unshaped pulley band, but also to permit the shaping on the same machine of pulley bands of different bead diameters and whether such pulley bands are circular or non-circular, i. e. are out of round.

While a specific embodiment of the invention has been shown and described, it is obvious that it is susceptible of modification within the terms of the appended claims. For instance, the sections may be hinged at one point and the continuity of the inner vacuum chamber maintained by an adjustable closure at another point when the sections are moved. These and other modifications or alterations are comprehended by the invention in its broad aspects.

Having thus described my invention, what I claim and desire to protect by Letters Patent is:

1. Vacuum tire-pulley-band shaping apparatus comprising a circumscribing vacuum box having a pulley band receiving opening around its inner perimeter, means for bodily varying the circumference of said box whereby its inner perimeter may be varied in length while maintaining its continuity, and means for exhausting air from said box.

2. Vacuum tire-pulley-band shaping apparatus comprising a circumscribing vacuum box having a pulley band receiving opening around its inner perimeter, said box composed of at least two sections telescopically adjustable in a direction circumferentially of the box, and means for exhausting air from said box.

3. Vacuum tire-pulley-band shaping apparatus comprising a circumscribing vacuum box having a pulley band receiving opening around its inner perimeter, said box walls being formed of relatively circumferentially adjustable overlapping sections, whereby a variable but continuous inner perimeter is obtained, and means for exhausting air from said box.

4. Vacuum tire-pulley-band shaping apparatus comprising a circumscribing vacuum box having a pulley band receiving opening around its inner perimeter, said box composed of two sections, one of which is telescopically adjustable with respect to the other circumferentially of and in the plane of the box, means for effecting said adjustment, and means for exhausting air from said box.

5. Vacuum tire-pulley-band shaping apparatus comprising a circumscribing vacuum box having a pulley band receiving opening around its inner perimeter, means for bodily varying the circumference of said box whereby its inner perimeter may be varied in length while maintaining its continuity, means whereby the box may be opened transversely of its axis, and means for exhausting air from said box.

6. Vacuum tire-pulley-band shaping apparatus comprising a substantially annular box of substantial U-shape in transverse section, with the open side on its inner perimeter, said box having closely interfitting separable upper and lower sections, each of said sections being composed of parts relatively circumferentially adjustable with respect to each other while maintaining the continuity of the section, and means for exhausting air from said box.

7. Vacuum tire-pulley-band shaping apparatus comprising a substantially annular box of substantial U-shape in transverse section, with the open side on its inner perimeter, said box having closely interfitting hingedly connected upper and lower sections, each of said sections being composed of circumferentially telescopically connected parts, and means for exhausting air from said box.

8. An apparatus for vacuously shaping pulley-bands to approximately tire form comprising an operatively endless box of approximately U-shaped cross section and open at its inner periphery, said box being divided transversely into at least two sections, means permitting said sections to be relatively moved, and means for maintaining the continuity of the U-shaped endless chamber when the sections are moved whereby pulley-bands may be vacuously shaped therein to approximately tire form.

Signed at Detroit, county of Wayne, State of Michigan, this 18th day of June, 1928.

ADRIAN O. ABBOTT, Jr.